United States Patent [19]

Shibata et al.

[11] Patent Number: 5,783,955
[45] Date of Patent: Jul. 21, 1998

[54] DRIVER CIRCUIT ARRANGEMENT USED IN A LOCAL AREA NETWORK

[75] Inventors: Tadashi Shibata, Toyokawa; Satoshi Suzuki, Nagoya, both of Japan

[73] Assignee: Nippondenso Co., Ltd., Kariya, Japan

[21] Appl. No.: 657,537

[22] Filed: Jun. 4, 1996

[30] Foreign Application Priority Data

Jun. 9, 1995 [JP] Japan .................. 7-143281

[51] Int. Cl.$^6$ .................. H03K 17/16; H03K 19/003
[52] U.S. Cl. .................. 327/108; 327/379; 326/30; 326/90
[58] Field of Search .................. 327/108, 109, 327/379, 380, 310, 312, 313, 318; 326/30, 21, 22, 23, 82, 83, 86, 89, 90

[56] References Cited

U.S. PATENT DOCUMENTS

| | | | |
|---|---|---|---|
| 4,596,940 | 6/1986 | Schuppan et al. | 307/443 |
| 4,739,323 | 4/1988 | Miesterfeld et al. | |
| 4,748,346 | 5/1988 | Emori | 326/90 |
| 4,890,010 | 12/1989 | Neudeck et al. | |
| 4,931,667 | 6/1990 | Pfennings et al. | 307/443 |
| 4,994,690 | 2/1991 | Sundstrom et al. | 326/90 |
| 5,283,478 | 2/1994 | Maloberti et al. | 327/379 |
| 5,321,320 | 6/1994 | Collins | 326/89 |
| 5,382,838 | 1/1995 | Sasaki et al. | 327/108 |
| 5,500,615 | 3/1996 | Barter | 326/89 |
| 5,587,681 | 12/1996 | Fobbester | 327/319 |

FOREIGN PATENT DOCUMENTS

2-224436  9/1990  Japan.

*Primary Examiner*—Timothy P. Callahan
*Assistant Examiner*—Eunja Shin
*Attorney, Agent, or Firm*—Cushman Darby & Cushman IP Group of Pillsbury Madison & Sutro LLP

[57] ABSTRACT

A transistor T26, serving as an output circuit 42, has a collector connected to a communication line B+ and an emitter connected to the other communication line B−. A base current generation circuit 44 generates a base current Ib for actuating transistor T26 based on a transmission signal. Transistors T24 and T25 constitute a current-mirror circuit. A correction circuit 46 takes in or absorbs a current equivalent to base current Ib from the collector of transistor T26, so as to equalize the drive currents IB+ and IB− flowing through twin communication lines B+ and B−. Since only one transistor T26 is used to actuate the twin communication lines B+ and B−, it, becomes possible to completely equalize the drive currents IB+ and IB− in their absolute values and to cause no phase dislocation between these two drive currents IB+ and IB−. Hence, the radio noises can be completely canceled when generated from each of twin communication lines B+ and B− due to change of currents flowing therethrough.

11 Claims, 7 Drawing Sheets

DRIVER CIRCUIT ARRANGEMENT USED IN A LOCAL AREA NETWORK

BACKGROUND OF THE INVENTION

1. Field of the Invention

This invention relates to a driver circuit arrangement for driving a pair of communication lines transmitting differential signals.

2. Related Art

In the field of data communications, there has been known the phenomenon that radio noises emitted from communication lines may cause malfunction of peripheral circuits or devices. Eliminating such adverse effects is essential for realizing a reliable communication system.

Change of currents, flowing through the communication lines, is known as one of major causes to generate this kind of radio noises, because the change of any current induces a change of magnetic field which possibly causes or leads to a noise. There is known a method of suppressing this kind of radio noises by simultaneously transmitting, through a pair of communication lines, two differential signals which are identical in their current changes but opposite in their phases, so as to mutually cancel the change of the magnetic field generated from each communication line.

For example, Unexamined Japanese Patent Publication No. HEI 2-24436, published in 1990, discloses a driver circuit, arrangement which drives a pair of communication lines capable of transmitting this kind of differential signals. According to this prior art, the driver circuit arrangement comprises a transistor having a function of taking in or absorbing a current proportional to a transmission signal and another transistor having a function of sending out or discharging a current proportional to the transmission signal. In other words, two communication lines are respectively driven by different transistors each being exclusively provided.

However, the above-described driver circuit arrangement does not work as intended because of dispersion or errors of products in manufacturing circuit elements and integrated circuits, or difference in the length or arrangement of wiring in each transistor. More specifically, the dispersion or errors in manufacturing of electronic products or the wiring difference above described leads to dispersion of characteristics of each transistor (amplification factor), dispersion of a value of a resistance to be connected to each transistor, or dispersion of a delay time of a signal controlled by each transistor.

Hence, it will not be easy to obtain perfectly or ideally identical current change and identical signal phase between two transistors even if these two transistors are driven by the same signal. Accordingly, there was a problem that a significant amount of radio noise was still left without being canceled due to the dispersion in the current change or the dispersion in signal phase between two transistors.

SUMMARY OF THE INVENTION

Accordingly, in view of above-described problems encountered in the related art, a principal object of the present invention is to provide a novel and excellent driver circuit arrangement capable of adequately suppressing radio noises from emitting from the twin or paired communication lines when these communication lines transmit the differential signals.

In order to accomplish this and other related objects, one aspect of the present invention provides a driver circuit arrangement comprising an output circuit and a drive circuit for actuating a pair of communication lines transmitting differential signals. More specifically, the output circuit comprises a semiconductor element having three terminals, i.e. a pair of input and output terminals for inputting and outputting current signals, and a control terminal for controlling the current signals flowing through the input and output terminals. The pair of input and output terminals of the semiconductor element are connected to the pair of communication lines, respectively. And, the drive circuit generates a drive signal to be supplied to the control terminal of the semiconductor element in accordance with a signal waveform of a transmission signal entered from an outside.

According to features of preferred embodiments of the present invention, the semiconductor element provided in the output circuit is a bipolar transistor having a collector and an emitter connected to the pair of communication lines respectively. The drive circuit generates a base current of the bipolar transistor as the drive signal. Meanwhile, a correction circuit is provided to equalize the current signals flowing through the pair of communication lines. The correction circuit adds or subtracts an electric amount equivalent to the base current to or from either of current signals entering in or flowing out of the bipolar transistor through the pair of communication lines.

Furthermore, according to the features of the preferred embodiments of the present invention, the output circuit comprises, as the semiconductor element, a first field effect transistor and a second field effect transistor. The first field effect transistor has a source and a drain connected to the pair, of communication lines, while the second field effect transistor has a source and a gate commonly connected to the source and a gate of the first field effect transistor. The second field effect transistor has a drain connected to its gate. The drive circuit supplies a drain current to the second field effect transistor as the drive signal to generate a gate voltage of the first field effect transistor. And, a correction circuit is provided to equalize the current signals flowing through the pair of communication lines. The correction circuit adds or subtracts an electric amount equivalent to a current flowing through the second field effect transistor from either of current signals entering in or flowing out of the first field effect transistor through the pair of communication lines.

Moreover, according to the features of the preferred embodiments of the present invention, the transmission signal is a binary signal, and the drive circuit has a charging and discharge circuit for charging and discharging a capacitor in accordance with a signal level of the binary signal, and generates the drive signal based on a voltage applied on the capacitor. In this case, it is preferable that the drive circuit further comprises an integration circuit which causes a smooth and continuous change of the binary signal at its building-up and trailing-edge portions when the binary signal is entered into the charging and discharge circuit.

Still further, according to the features of the present invention, the driver circuit arrangement further comprises a waveform shaping circuit, a ramp waveform generation circuit, and a voltage-current conversion circuit. More specifically, the waveform shaping circuit receives a digital transmission signal from a protocol controller and changes its waveform into a rectangular waveform. The ramp waveform generation circuit receives the rectangular-waveform signal from the waveform shaping circuit and converts it into a voltage signal having a predetermined ramp waveform. And, the voltage-current conversion circuit converts the ramp-waveform voltage signal into a current signal. In this case, the drive circuit receives the current signal from the voltage-current conversion circuit to generate the base current.

It is preferable in the above drive circuit arrangement to further comprise a correction circuit which takes in or absorbs a current, whose value is equivalent to the base current, from a collector of the semiconductor element, so as to equalize a current flowing through one communication line with a current flowing through the other communication line.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Preferred embodiments of the present invention will be explained in greater detail hereinafter, with reference to the accompanying drawings. Identical parts are denoted by the same reference numeral throughout views.

First Embodiment

Figure 2:
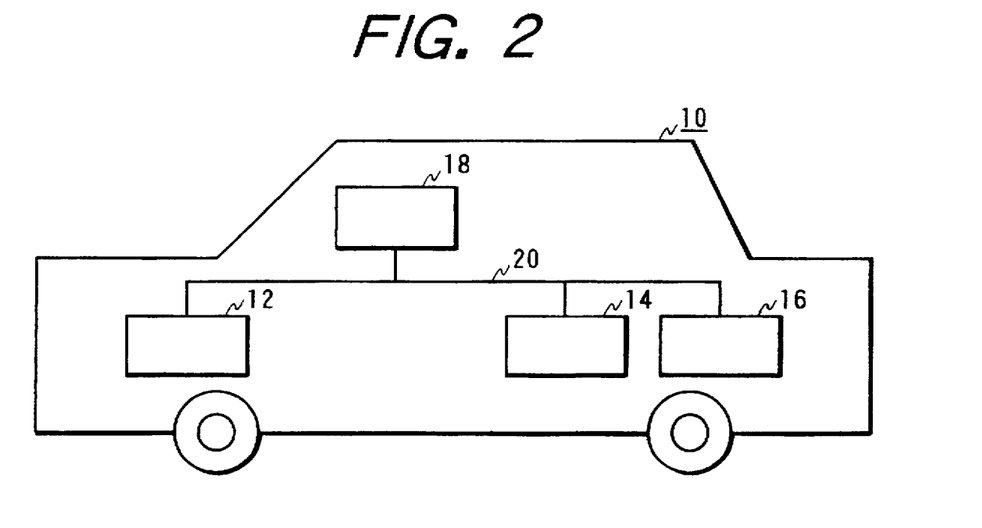
FIG. 2 is a schematic view showing an arrangement of a LAN system incorporated in an automotive vehicle in accordance with the present invention.

FIG. 2 is a schematic view showing an arrangement of an automotive LAN system comprising a driver circuit of a preferred embodiment of the present invention. As shown in FIG. 2, the automotive LAN system comprises an engine ECU (electronic control unit) 12, an anti-skid ECU 14, a suspension ECU 16 and an instrument ECU 18, which are disposed at appropriate portions in a discrete manner in an automotive vehicle 10.

Engine ECU 12 inputs an intake air amount, a throttle opening degree, an engine speed, a crank angle and other sensor signals and controls a fuel injection amount and an ignition timing of an internal combustion engine based on these input signals. Anti-skid ECU 14 inputs wheel speeds and controls the hydraulic brake pressures based on the input wheel speeds so as to prevent the wheels from locking.

Suspension ECU 16 inputs a vehicle speed, the throttle opening degree or the like and controls the damping coefficient of each shock absorber and the spring constant of each spring based on these input signals. Instrument ECU 18 monitors the operational conditions of the internal combustion engine and the control conditions of each ECU and displays the monitored data on a front panel (instrument panel) in a passenger compartment of the automotive vehicle. Above-described ECU 12 through ECU 18 are mutually connected via bus line 20.

ECU 12 through 18 mutually exchange their control data and sensor information via bus lie 20. Through transmission and reception of data among these plural CPU via bus line 20, an overall control of the automotive vehicle is realized in an integrated manner.

Figure 3:
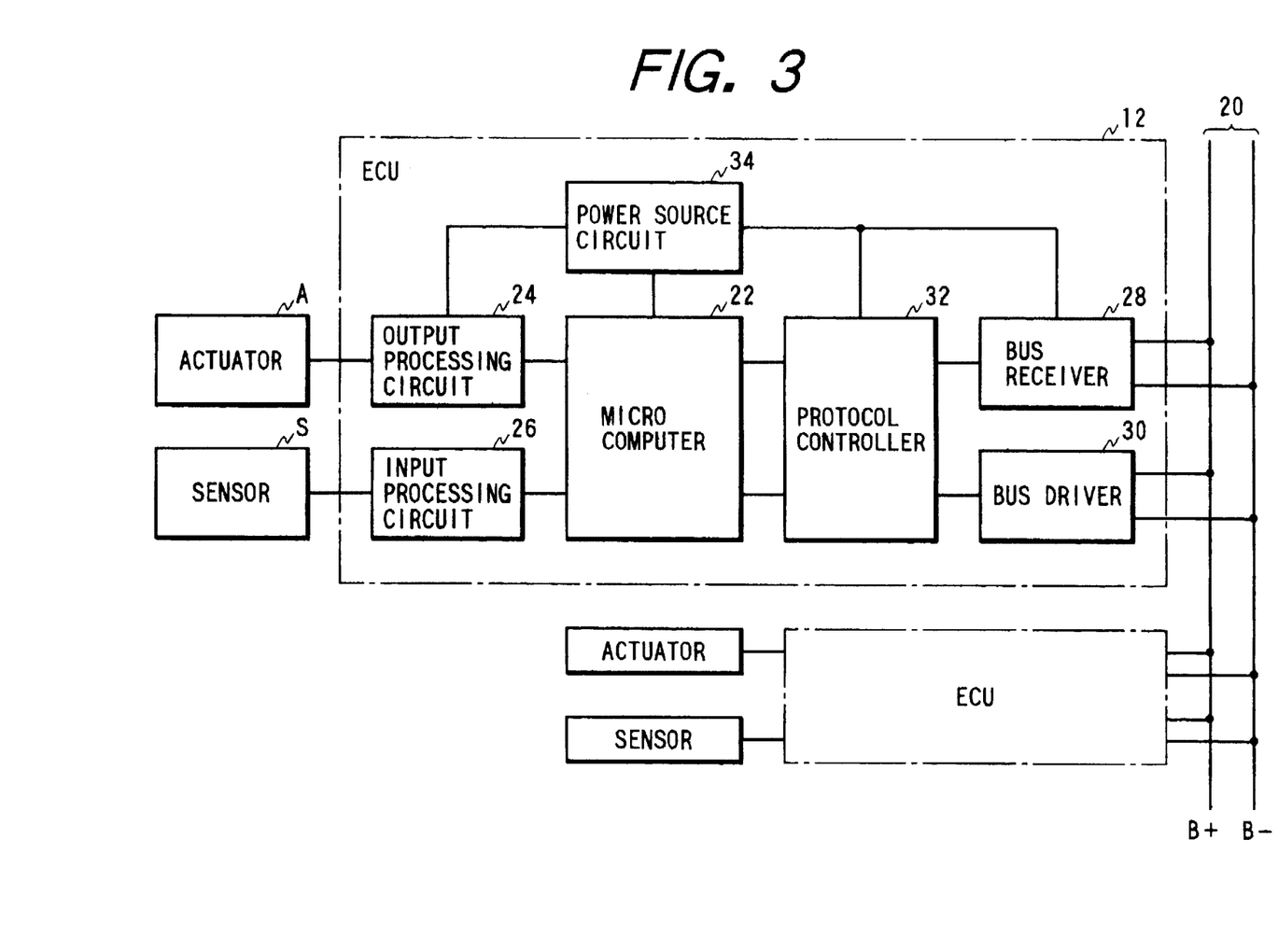
FIG. 3 is a block diagram showing the interior arrangement of an ECU constituting part of the automotive LAN system in accordance with the present invention.

FIG. 3 is a block diagram showing the interior arrangement of each ECU constituting part of the automotive LAN system shown in FIG. 2. Each ECU is fundamentally the same in the circuit arrangement; therefore, only engine ECU 12 will be explained in detail hereinafter.

As shown in FIG. 3, engine ECU 12 comprises a micro computer 22, an output processing circuit 24, an input processing circuit 26, a bus receiver 28, a bus driver 30, a protocol controller 32, and a power source circuit 34.

Micro computer 22 is chiefly constituted by a CPU, a ROM and a RAM. Output processing circuit 24 generates a drive signal for an actuator A (e.g. a fuel injector drive solenoid) connected to engine ECU 12 on the basis of computations in micro computer 22. Input processing circuit 26 inputs a detection, signal received from a sensor S (e.g. a crank angle sensor) connected to engine ECU 12 and sends the detection signal to micro computer 22. Bus receiver 28 receives a communication signal from bus line 20. Bus driver 30 sends out a communication signal to bus line 20.

Protocol controller 32 converts the communication signal received by bus receiver 28 into a signal processible by micro computer 22, while converting the data sent out from micro computer 22 into a communication signal transmissible through bus line 20. Protocol controller 32 regulates the transmission and reception of data in compliance with a predetermined protocol. Power source circuit 34 supplies electric power to various sections in engine ECU 12.

Bus line 20 consists of a pair of B+ and B− communication lines. Bus receiver 28 and bus driver 30 are cooperative to send out and receive the differential signals.

As well known, ECU 12 through 18 are connected to different kinds of actuators A and sensors S.

Next, bus driver 30, which is an essential component of the present invention, will be explained.

Figure 1:
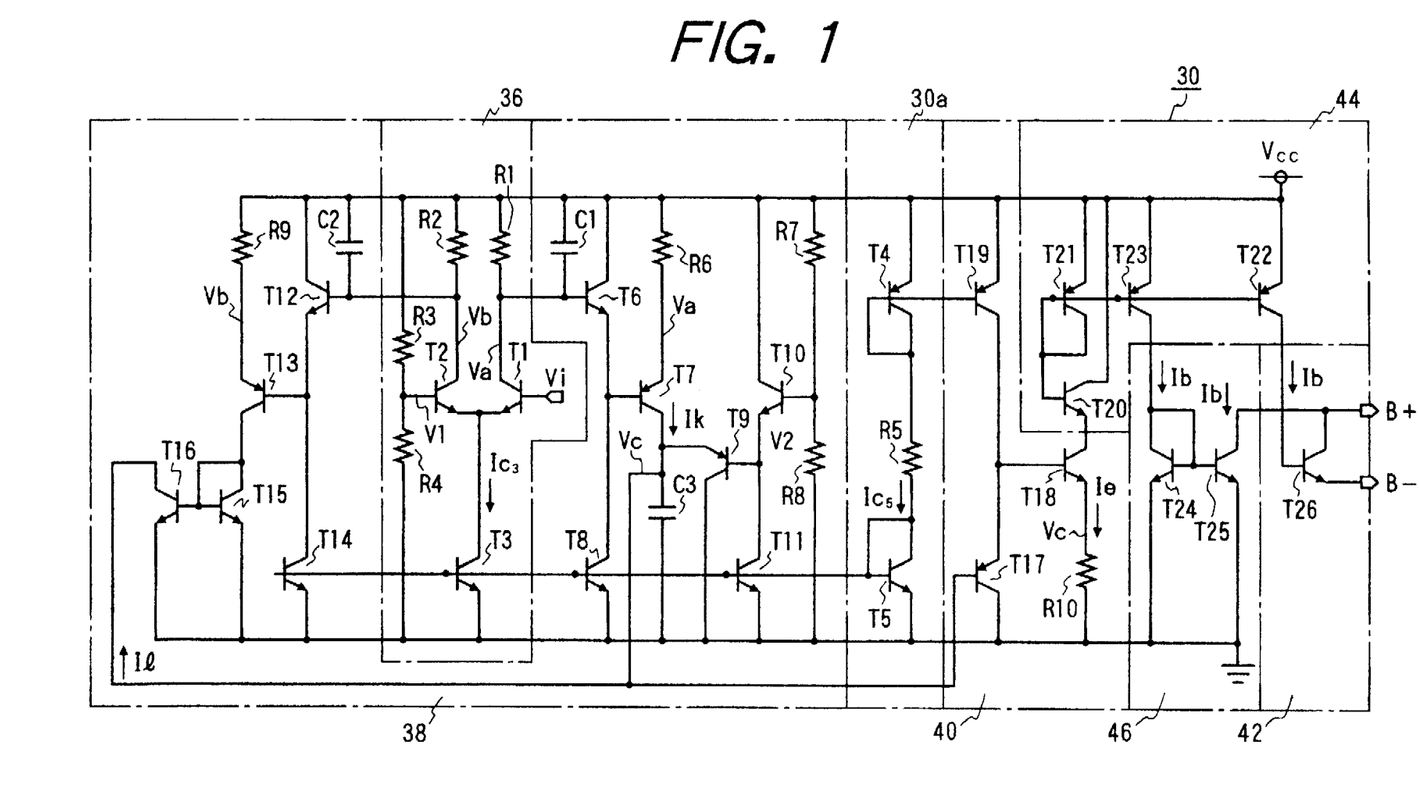
FIG. 1 is a circuit diagram showing the details of an arrangement of a bus driver in accordance with a first embodiment of the present invention.
Figure 4:
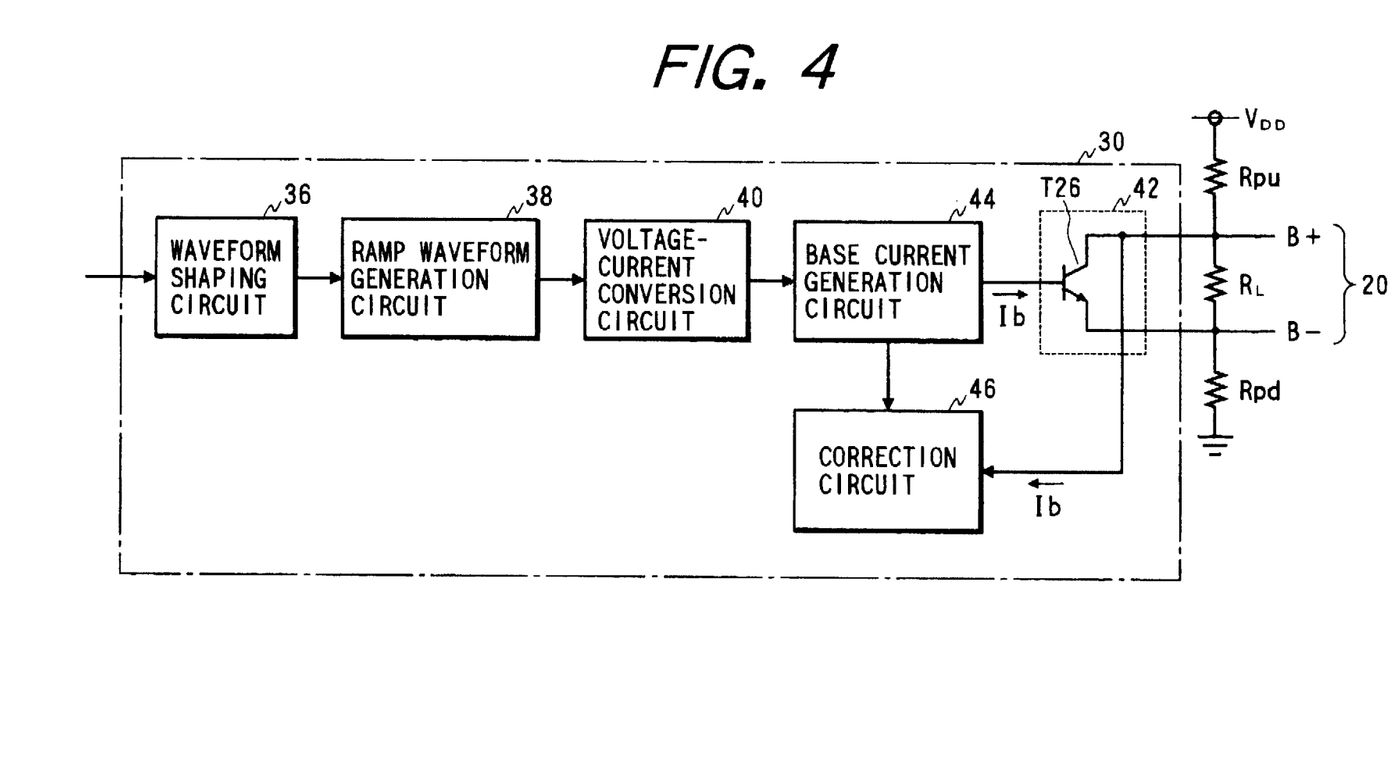
FIG. 4 is a block diagram showing a schematic arrangement of the bus driver used in an ECU for the automotive LAN system in accordance with the first embodiment of the present invention.

FIG. 4 is a block diagram showing a schematic arrangement of bus driver 30, while FIG. 1 is a circuit diagram showing the details of the arrangement of bus driver 30.

As shown in FIG. 4, bus driver 30 comprises a waveform shaping circuit 36, a ramp waveform generation circuit 38, a voltage-current conversion circuit 40, an output circuit 42, a base current generation circuit 44 and a correction circuit 46.

Waveform shaping circuit 36 receives a digital (binary) transmission signal from protocol controller 32 and changes its waveform into a rectangular waveform free from noise. Ramp waveform generation circuit 38 receives the rectangular-waveform signal from waveform shaping circuit 44 and converts it into a voltage signal having a predetermined ramp waveform. More specifically, this voltage signal has a predetermined positive gradient at its building-up portion (ascending ramp) and has a negative gradient at its trailing-edge portion (descending ramp).

Voltage-current conversion circuit 40 converts the ramp-waveform voltage signal into a current signal. Output circuit 42 comprises a bipolar transistor T26 having a collector connected to one communication line B+ and an emitter connected to the other communication line B−.

Base current generation circuit 44 receives the current signal from voltage-current conversion circuit 40 and generates a base current Ib in accordance with the current signal. Base current Ib is sent to the base of transistor T26 of output circuit 42.

Correction circuit 46 takes in or absorbs a current, whose value is equivalent to base current Ib, from the collector of transistor T26. Correction circuit 46 corrects the output current in such a manner that a current flowing through once communication line B+ is equalized with a current flowing through the other communication line B−.

Communication line B+ is pulled up by a resistance Rpu, while communication line B− is pulled down by a resistance Rpd. A resistance RL represents a composite resistance (i.e. composite impedance) of other bus drivers and other bus receiver connected to bus line 20.

More specifically, as shown in FIG. 1, waveform shaping circuit 36 comprises a plurality of transistors T1 through T3 and a plurality of resistances R1 through R4, constituting a well-known differential amplifier circuit. A transistor T1 is turned on when an input voltage Vi of a transmission signal applied to the base of a transistor T1 is in a High level, which is larger than a reference voltage V1 obtained by dividing a power source voltage Vcc by resistances R3 and R4. A transistor T2 is turned off when transistor T1 is turned on.

On the contrary, transistor T1 is turned off when input voltage Vi of the transmission signal applied to the base of a transistor T1 is in a Low level, which is smaller than reference voltage V1. Transistor T2 is turned on when transistor T1 is turned off.

A transistor T3 is connected with a transistor T5 by a current-mirror connection. Transistor T5 constitutes a constant-current circuit 30a together with another transistor T4 and a resistance R5. A collector current IC3 of transistor T3 is identical with a collector current IC5 of transistor T5.

Hereinafter, suffix "XN" represents the X-terminal (i.e. collector, emitter or base) of transistor N.

Collector current IC3 of transistor T3 is defined by the following equation.

$$IC3 = IC5 = (Vcc - VBE4 - VBE5)/R5 \quad (1)$$

where VBE4 represents a base-emitter voltage of transistor T4, while VBE5 represents a base-emitter voltage of transistor T5.

Accordingly, when transistor T1 is turned on, a voltage drop $\Delta V$ generated at resistance R1 is defined by the following equation.

$$\begin{aligned}\Delta V &= Vcc - Va = IC3 \times R1 \quad (2)\\ &= (Vcc - 2VBE) \cdot R1/R5\end{aligned}$$

where Va represents a collector voltage of transistor TR1. VBE4=VBE5=VBE. Hereinafter, it is assumed that all the transistors T1 through T26 have a base-emitter voltage VBE.

When transistor T2 is turned on, a voltage drop generated at resistance R2 is obtained by replacing R1 by R2 in the equation (2). When R1 is identical with R2, both voltage drops are the same values.

Next, ramp waveform generation circuit 38 comprises a plurality of transistors T6 through T16, a plurality of resistances R6 through R9, and capacitors C1 through C3. Transistors T6 through T8 and resistance R6 cooperatively constitute a charging circuit for charging capacitor C3. Transistors T9 through T11 and resistances R7, R8 cooperatively constitute a limiter circuit for restricting the upper limit of terminal voltage Vc of capacitor C3. Transistors T12 through T16 and resistance R9 cooperatively constitute a discharge circuit for discharging capacitor C3.

An emitter voltage VE7 of transistor T7 is defined by the following expression.

$$VE7 = Va - VBE6 + VBE7 = Va \quad (3)$$

where VBE6 represents a base-emitter voltage of transistor T6, while VBE7 represents a base-emitter voltage of transistor T7.

Accordingly, when the input voltage Vi is in the Low level, resistance R6 causes no voltage drop as well as resistance R1. Hence, transistor T7 does not cause a collector current; namely, capacitor C3 does not receive a charging current Ik.

On the other hand, when the input voltage V1 is in the High level, resistance R6 causes the voltage drop $\Delta V$ as well as resistance R1. Hence, capacitor C3 receives charging current Ik and is charged. In this case, charging current Ik is defined by the following equation.

$$\begin{aligned}Ik &= \Delta V/R6 = (Vcc - 2VBE) \cdot R1/(R5 \cdot R6) \quad (4)\\ &= (Vcc - 2VBE)/R5\end{aligned}$$

where it is assumed that resistance R1 is equal to resistance R6.

Terminal voltage Vc of capacitor C3 is expressed as a function of time "t", when capacitor C3 is charged by a constant current Ik.

$$\begin{aligned}Vc(t) &= (Ik/C3) \cdot t \quad (5)\\ &= (Vcc - 2VBE)/(R5 \cdot C3) \cdot t\end{aligned}$$

A reference voltage V2 is obtained by dividing power source voltage Vcc by resistances R7 and R8. When terminal voltage Vc of capacitor C3 exceeds this reference voltage V2, the transistor T9 constituting part of the limiter circuit is turned on so as to take in or absorb collector current Ik of transistor T7. Accordingly, terminal voltage Vc of capacitor C3 never exceeds the reference voltage V2. In other words, the upper limit of terminal voltage Vc is limited. In this case, terminal voltage Vc(max) is defined by the following equation.

$$Vc(max) = V2 = Vcc \cdot R8/(R7 + R8) \quad (6)$$

On the other hand, in the discharge circuit, as well as the charging circuit, an emitter voltage VE13 of transistor T13 is equal to a collector voltage Vb of transistor T2. Accordingly, when the input voltage Vi is in the High level, the resistance R9 causes no voltage drop as well as resistance R2. Hence, a collector current IC13 does not flow through transistor T13.

On the other hand, when the input voltage V1 is in the Low level, resistance R9 causes the voltage drop $\Delta V$ as well as resistance R2. Hence, collector current IC13 comparable with current Ik defined by equation (4) is flowed. (In this case, it is assumed that resistance R2 is equal to resistance R9)

By the current-mirror circuit constituted by transistors T15 and T16, the transistor T16 receives a collector current identical with collector current IC13 (i.e. discharge current I1). With this collector current IC13, capacitor C3 is discharged. (When R1=R2 and R6=R9, charging current Ik is equal to discharge current I1)

In this manner, providing the ramp waveform generation circuit 38 makes it possible to form the waveform of terminal voltage Vc of capacitor C3 into a ramp waveform increasing at a predetermined rate in its building-up portion and decreasing at a predetermined rate in its trailing-edge portion, with the upper limit restricted up to reference voltage V2.

Capacitor C1, connected to the base of transistor T6, constitutes an integration circuit together with resistance R1 in order to prevent the voltage Va from changing rapidly. Capacitor C2, connected to the base of transistor T12, constitutes an integration circuit together with resistance R2 in order to prevent the voltage Vb from changing rapidly. Thus, it becomes possible to smooth or moderate the building-up and trailing-edge of the ramp waveform, reducing higher harmonics components involved in the signal.

Next, voltage-current conversion circuit 40 comprises transistors T17 through T19 and resistance R10. An emitter voltage VE18 of transistor T18 is defined by the following equation.

$$VE18 = Vc + VBE17 - VBE18 = Vc \qquad (7)$$

where VBE17 represents a base-emitter voltage of transistor T17, while VBE18 represents a base-emitter voltage of transistor T18.

Accordingly, terminal voltage Vc of capacitor C3 is applied to the both ends of resistance 10. Correspondingly, an electric current Ie flows.

$$Ie = Vd/R10 = Vc/R10 \qquad (8)$$

Gradient of current Ie at its building-up and trailing-edge portions can be expressed by the following equation based on equations (5) and (8).

$$dIe/dt = (Vcc - 2VBE)/(R5 \cdot R10 \cdot C3) \qquad (9)$$

In other words, the gradient of current Ie can be determined by resistances R5 and R10 and capacitor C3. Furthermore, the upper limit of current Ie can be expressed by the following equation based on equations (6) and (8).

$$Ie(max) = Vcc \cdot R8/((R7+R8) \cdot R10) \qquad (10)$$

In other words, the upper limit of current Ie can be determined by resistances R7, R8 and R10.

Explained next will be the base current generation circuit 44 constituted by transistors T20 through T23, the correction circuit constituted by transistors T24 and T25, and the output circuit 42 constituted by transistor T26.

For the purpose of simplifying the explanation, it is assumed that "β" represents the AC amplification factor of transistors T20 and T26 while "ω (infinite)" represents the AC amplification factor of transistors T18, T21 through T25. "IEn" represents an emitter current flowing through each transistor Tn, "ICn" represents a collector current flowing through each transistor Tn, and "IBn" represents a base current flowing through each transistor Tn.

Current Ie flowing through resistance R10 in response to terminal voltage Vc of capacitor C3 is equal to an emitter current IE20 of transistor T20. Base current IB20 of transistor T20 is equal to a collector current IC21 of transistor T21. Hence, current Ie can be expressed by the following equation.

$$Ie = IE20 = IB20 \cdot (1+\beta) \qquad (11)$$
$$= IC21 \cdot (1+\beta)$$

If transistors T22 and T23 respectively have an amplification factor which is n times as large as the amplification factor of transistor T21, their collector currents, IC21, IC22 and IC23 are expressed by the following equation as these transistors T21, T22 and T23 constitute a current-mirror circuit.

$$Ib = IC22 = IC23 = n \cdot IC21 = n \cdot Ie/(1+\beta) \qquad (12)$$

Namely, base current generation circuit 44 supplies the same current Ib to output circuit 42 and correction circuit 46.

This current Ib is equal to a base current IB26 of transistor T26 in the output circuit 42. Hence, its emitter current IE26, i.e. a drive current IB- actuating communication line B-, is expressed by the following equation.

$$IB- = IE26 = IB26 \cdot (1+\beta) = Ib \cdot (1+\beta) \qquad (13)$$
$$= n \cdot Ie$$

On the other hand, in the correction circuit 46, current Ib supplied from base current generation circuit 44 is equal to a collector current IC24 of transistor T24. Meanwhile, transistor T25 constitutes a current-mirror circuit together with transistor T24. A collector current IC25 of transistor T25 is equal to the collector current IC24 (i.e. current Ib).

Accordingly, correction circuit 46 acts as a current source for taking in or absorbing current Ib from the collector of transistor T26.

Drive current IB+, driving communication line B+, is a summation of collector current IC26 of transistor T26 and current IC25 taken in or absorbed by correction circuit 46. Collector current IC26 is obtained by subtracting base current IB26 from emitter current IE26. Hence, drive current IB+ is defined by the following equation.

$$IB+ = IC26 + IC25 = (IE26 - IB26) + Ib = IE26 \qquad (14)$$
$$= n \cdot Ie$$

Drive current IB+ of communication line B+ is taken in or absorbed by bus driver 30, while drive current IB- of communication line B- is sent out or discharged from bus driver 30. That is, drive current IB+ flowing through communication line B+ of bus line 20 is identical in absolute value with drive current IB- flowing through communication line B- of bus line 20. But, the drive current IB+ is opposite to the drive current IB-in the direction of current flow.

Figure 5:
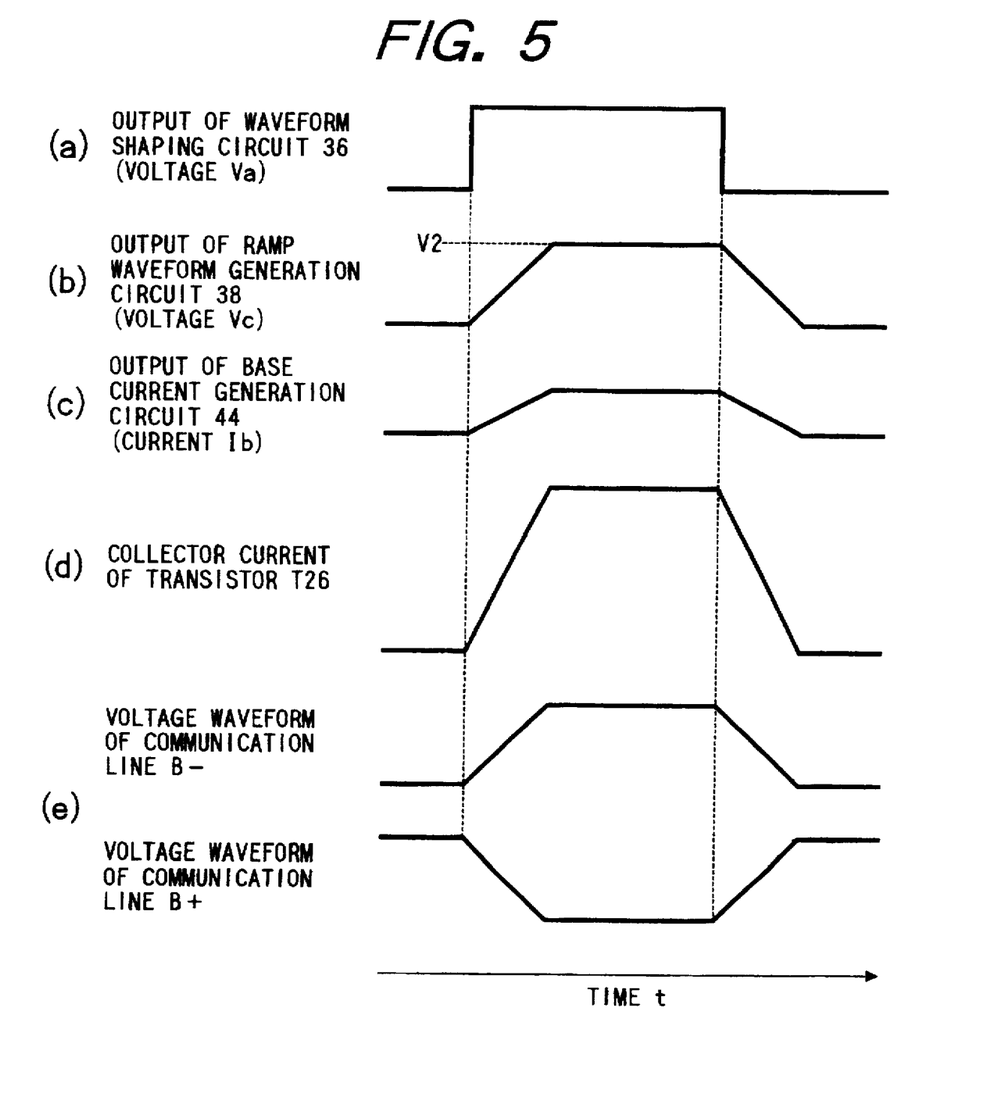
FIG. 5 is a view showing signal waveforms at various points in the bus driver in accordance with the first embodiment of the present invention.

According to the above-described arrangement of bus driver 30, the input communication signal is first entered into waveform shaping circuit 36 wherein its waveform is converted into the rectangular waveform shown by (a) in FIG. 5. Thereafter, the rectangular waveform signal is entered into ramp waveform generation circuit 38 to convert the rectangular waveform signal into the voltage signal having the ramp waveform shown in (b) of FIG. 5.

Thus obtained voltage signal is entered into the voltage-current conversion circuit 40 wherein the voltage signal is converted into the current signal. Subsequently, the current signal is entered into the base current generation circuit 44 In accordance with the current signal entered, the base current generation circuit 44 generates the current Ib shown by (c) in FIG. 5.

The correction circuit 46 takes in or absorbs the current Ib from the collector of transistor T26 which is connected to the communication line B+, current Ib being equal to the base current of transistor T26. Drive currents IB+ and IB− flow through twin communication lines B+ and B−, which are both connected to the output circuit 42. Drive currents IB+ and IB− are equivalent with a summation of current Ib shown by (c) of FIG. 5 and collector current IC26 of transistor T26 shown by (d) of FIG. 5.

Accordingly, voltages are generated on twin communication lines B+ and B− by the pull-up resistance Rpu and pull-down resistance Rpd which are respectively connected to twin communication lines B+ and B−. If these resistances Rpu and Rpd are identical with each other, the voltage signals transmitted via twin communication lines B+ and B− are identical in their amplitude and opposite in their phase as shown by (e) in FIG. 5.

Although FIG. 5 neglects the function of capacitors C1 and C2 in the ramp waveform generation circuit 38 for the purpose of simplifying the drawing, it will be readily understood when the function of capacitors C1 and C2 is taken into consideration that the waveforms shown in FIG. 5 will cause smooth and continuous changes due to the presence of capacitors C1 and C2 rather than rapid and non-continuous changes.

As explained above, in the automotive LAN system in accordance with the first embodiment of the present invention, bus driver 30 provided in each ECU comprises only one bipolar transistor T26 whose emitter and collector are connected to twin communication lines B+ and B− which cooperatively constitute the bus line 20.

Thus, twin communication lines B+ and B− are simultaneously actuated by the single transistor T26, so that no dislocation is caused in the changes of current values (i.e. phase difference) between twin communication lines B+ and B−.

Furthermore, the correction circuit 46 has a function of taking in or absorbing a current from the collector of transistor T26 by an amount equivalent to base current Ib, so that the current flowing through one communication line B− connected to the collector of transistor T26 is equalized with the current flowing through the other communication line B−connected to the emitter of transistor T26.

Accordingly, magnetic fields generated from the twin communication lines B+ and B− of bus line 20, due to the changes of drive currents IB+ and IB−, are surely canceled. Hence, radio noises emitted from bus line 20 can be surely suppressed regardless of generation of this kind of magnetic fields.

Furthermore, according to the first embodiment of the present invention, the transmission signal is converted into a signal having the ramp waveform which includes a small amount of higher harmonics components compared with the rectangular waveform, thus converted transmission signal being sent out or discharged to the bus line 20. Still further, the provision of capacitors C1 and C2 is effective to prevent the ramp waveform from changing in non-continuous manner at its building-up and trailing-edge portions, thus reducing the higher harmonics components.

Accordingly, the bus driver 30 of the first embodiment of the present invention makes it possible to surely suppress the radio noises derived from the higher harmonics components involved in the transmission signals.

Figure 6:
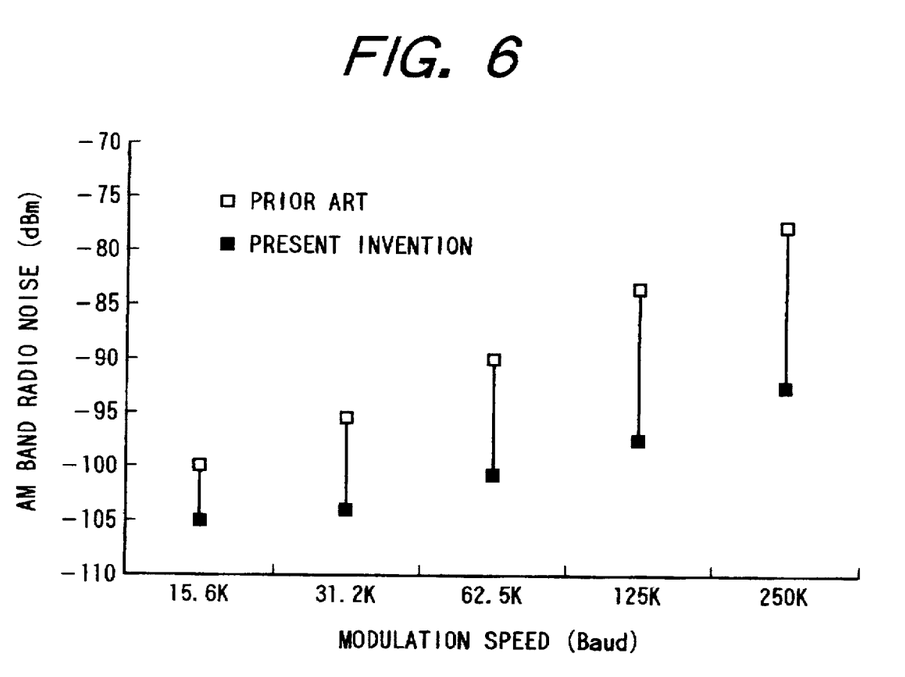
FIG. 6 is a graph showing the radio noises of the bus driver of the first embodiment of the present invention in comparison with the radio noises of the conventional bus driver.

FIG. 6 is a graph showing AM-band radio noises of bus driver 30 of the first embodiment of the present invention wherein the twin communication lines B+ and B− are actuated by the only one transistor T26, in comparison with AM-band radio noises of the conventional bus driver wherein the twin communication lines B+ and B− are actuated by independent two transistors.

As apparent from FIG. 6, using the bus driver 30 of the first embodiment of the present invention makes it possible to improve the radio noise by −15 dB (one sixth) at the modulation speed 250K [Baud], compared with the conventional bus driver.

In this manner, it becomes possible to remarkably reduce the radio noises emitted from bus line 20 by adopting the bus driver 30 of the first embodiment of the present invention for the automotive LAN system. Various electronic devices can be surely prevented from operating erroneously due to radio noises, thus enhancing the reliability of the LAN system.

According to the above-described first embodiment, an NPN transistor is used as transistor T26 connected to the twin communication lines B+ and B−. Correction circuit 46 has the function of taking in or absorbing the predetermined amount of current equivalent to the base current Ib from the collector of transistor T26 in order to equalize the currents flowing through the twin communication lines B+, B− with the emitter current of transistor T26. However, it is possible to take in or absorb the predetermined amount of current equivalent to the base current Ib from the emitter of transistor T26 to equalize the current flowing through the twin communication lines B+, B− with the collector current of transistor T26.

Furthermore, a PNP transistor can be used as transistor T26. In this case, correction circuit 46 will be constituted in such a manner that the base current Ib is supplied to either of the emitter or the collector of transistor T26.

Second Embodiment

Figure 7:
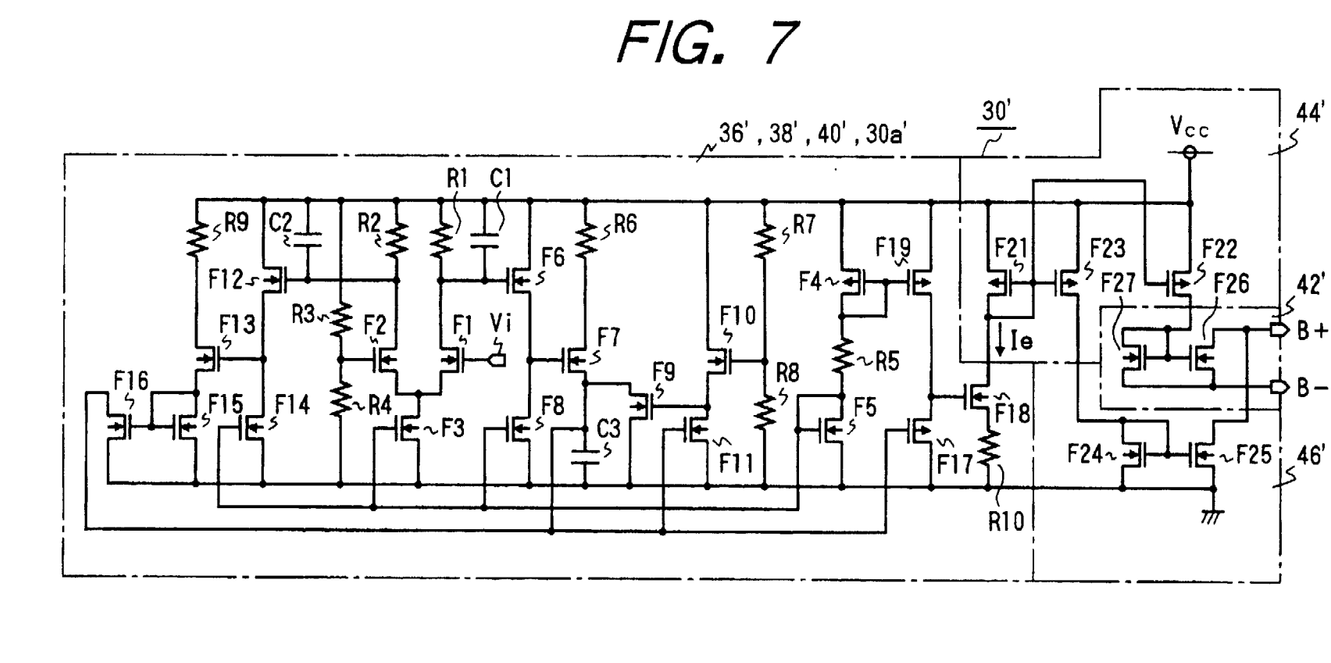
FIG. 7 is a circuit diagram showing the details of an arrangement of a bus driver in accordance with a second embodiment of the present invention.

FIG. 7 is a circuit diagram showing the details of an arrangement of a bus driver 30' in accordance with a second embodiment of the present invention.

Bus driver 30' of the second embodiment is different from bus driver 30 of the first embodiment in that transistors T1 through T26 are replaced by field effect transistors (FET) F1–F19 and F21–F26. That is, each NPN transistor is replaced by N-channel MOS-FET and each PNP transistor is replaced by P-channel MOS-FET. In FIG. 7, a block corresponding to the block in the first embodiment is denoted by the same reference numeral but suffixed by a "'(dash)".

Waveform shaping circuit 36', ramp waveform generation circuit 38', voltage-current conversion circuit 40' and constant-current circuit 30' are obtained from the counterpart circuits of bus driver 30 of the first embodiment by simply replacing the transistors by the MOS-FET, and therefore operate in the same manner. As a result, an electric current flowing into the drain of transistor F18 has a ramp waveform similar to the emitter current Ie of transistor T18 in FIG. 1.

Next, drive current generation circuit 44' is equivalent to the circuit obtained by removing transistor T20 from the base current generation circuit 44 of the first embodiment. Current Ie, generated from voltage-current conversion circuit 40', flows as a drain current ID21 of transistor F21.

Transistors F21, F22 and F23 cooperatively constitute a current-mirror circuit. When the amplification factor of transistors F22 and F23 is equal to the amplification factor of transistor F21, their drain currents ID22 and ID23 are equal to a drain current ID21 (=Ie) flowing through transistor F21. This; electric current Ie is supplied to output circuit 42' and correction circuit 46'.

Output circuit 42' comprises a transistor F26 having a drain and a source connected to twin communication lines B+ and B−, and a transistor F27 receiving drive current Ie as a drain current from the drive current generation circuit 44'. Transistors F26 and F27 cooperatively constitute a current-mirror circuit.

Transistors F27 has a source and a gate commonly connected to the source and a gate of transistor F26 (Transistors F26 and F27 have the common source and gate). Transistor F27 has a drain connected to its gate.

Accordingly, when the amplification factor of transistor F26 is N times as large as that of transistor F27, the drain current ID26 of transistor F26 is equal to N·Ie.

As transistors F26 and F27 have the common source, the drive current IB− flowing through communication line B− connected to the source of transistor F26 is defined by the following equation.

$$IB- = ID26 + ID27 \quad (15)$$
$$= (N+1) \cdot Ie$$

On the other hand, in the correction circuit 46' comprising transistors F24 and F25, electric current Ie supplied from drive current generation circuit 44' flows as a drain current of transistor F24. Transistor F25, constituting the current-mirror circuit together with transistor F24, acts as a current source for taking in or absorbing an electric current equal to electric current Ie from the drain of transistor F26.

As a result, the drive current IB+ actuating communication line B+ connected to the drain of transistor F26 becomes a summation of drain current ID26 (=N·Ie) of transistor F26 and current ID25 (=Ie) taken in or absorbed in correction circuit 46'. Hence, drive current IB+ can be expressed by the following equation.

$$Ib+ = (N+1) \cdot Ie \quad (16)$$

Drive current IB+ of communication line B+ is taken in or absorbed by bus driver 30', while drive current IB− of communication line B− is sent out or discharged from bus driver 30'. In short, both drive currents IB+ and IB− flowing through twin communication lines B+ and B− of bus line 20 are identical with each other in their absolute values and opposite in the direction of current flow. Thus, it becomes possible to obtain the same effects as those of the first embodiment.

Although the correction circuit 46' of the second embodiment has transistor F26 taking in or absorbing the current from its drain, it is needless to say that the current can be taken in or absorbed from the source of transistor F26. In this case, drive currents IB+ and IB− flowing through twin communication lines B+ and B− are equal to N·Ie.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A driver circuit arrangement for actuating a pair of communication lines transmitting differential signals, comprising:

an output circuit comprising a semiconductor element having an input terminal and an output terminal for inputting and outputting current signals and a control terminal for controlling said current signals flowing through said input and output terminals, said input and output terminals of said semiconductor element being connected to said pair of communication lines respectively, wherein said semiconductor element is a bipolar transistor which includes a collector and an emitter being connected to said input and output terminals respectively;

a drive circuit generating a drive signal to be supplied to said control terminal of said semiconductor element in accordance with a signal waveform of a transmission signal entered from an outside, wherein said drive circuit generates a base current of said bipolar transistor as said drive signal; and a correction circuit being provided for equalizing current signals flowing through said pair of communication lines, said correction circuit adding or subtracting an electric current amount equivalent to said base current to or from current signals entering in or flowing out of said bipolar transistor through said pair of communication lines.

2. A driver circuit arrangement for actuating a pair of communication lines transmitting differential signals comprising:

an output circuit comprising a plurality of semiconductor elements having an input terminal and an output terminal for inputting and outputting current signals and a control terminal for controlling said current signals flowing through said output terminal, said input and output terminals of one of said semiconductor elements being connected to said pair of communication lines respectively, wherein a first field effect transistor having a source and a drain connected to said output and input terminals and a second field effect transistor having a source and a gate commonly connected to the source and a gate of said first field effect transistor, said second field effect transistor having a drain connected to its gate;

a drive circuit generating a drive signal to be supplied to said control terminal of said output circuit in accordance with a signal waveform of a transmission signal entered from an outside, wherein said drive circuit supplies a drain current to said second field effect transistor as said drive signal to generate a gate voltage of said first field effect transistor; and a correction circuit is provided to equalize current signals flowing through said pair of communication lines, said correction circuit adding or subtracting an electric amount equivalent to a current flowing through said second field effect transistor from current signals entering in or flowing out of said first field effect transistor through said pair of communication lines.

3. The driver circuit arrangement in accordance with claim 1, wherein said transmission signal is a binary signal, and said drive circuit has a charging and discharge circuit for charging and discharging a capacitor in accordance with a signal level of said binary signal, and generates said drive signal based on a voltage applied on said capacitor.

4. The driver circuit arrangement in accordance with claim 3, wherein said drive circuit further comprises an integration circuit which causes a smooth and continuous change of said binary signal at its building-up and trailing-edge portions when said binary signal is entered into said charging and discharge circuit.

5. The driver circuit arrangement in accordance with claim 1, further comprising a waveform shaping circuit which receives a digital transmission signal from a protocol controller and changes its waveform into a rectangular waveform, a ramp waveform generation circuit which receives said rectangular-waveform signal from said waveform shaping circuit and converts it into a voltage signal having a predetermined ramp waveform, and a voltage-current conversion circuit which converts said ramp-waveform voltage signal into a current signal wherein said drive circuit receives said current signal from said voltage-current conversion circuit to generate said base current.

6. The driver circuit arrangement in accordance with claim 1, wherein said correction circuit is connected to said drive circuit to determine said electric current amount equivalent to said base current in accordance with said drive signal supplied from said drive circuit.

7. The driver circuit arrangement in accordance with claim 6, wherein said correction circuit further comprises a current mirror circuit which equalizes said electric current amount equivalent to said base current with said drive signal.

8. The driver circuit arrangement in accordance with claim 3, wherein said charging and discharge circuit generates a slope signal varying at a constant gradient.

9. The driver circuit arrangement in accordance with claim 3, further comprising a voltage clamping circuit which reduces electric charge from said capacitor to suppress a charging level of said capacitor within a predetermined voltage.

10. The driver circuit arrangement in accordance with claim 9, wherein said drive circuit further comprises an integration circuit which causes a smooth and continuous change of said binary signal at its building-up and trailing-edge portions when said binary signal is entered into said charging and discharge circuit.

11. The driver circuit arrangement in accordance with claim 5, wherein said ramp waveform of said ramp-waveform voltage signal has a constant gradient, and said voltage-current conversion circuit converts said ramp-waveform voltage signal into the current signal by using a resistor.

* * * * *